US012687269B2

United States Patent
(12) United States Patent
Grüter et al.

(10) Patent No.: US 12,687,269 B2
(45) Date of Patent: Jul. 21, 2026

(54) HEADLAMP FOR A MOTOR VEHICLE

(71) Applicant: Hella GmbH & Co. KGaA, Lippstadt (DE)

(72) Inventors: Frank Grüter, Lippetal (DE); Wolf Alexander Quitsch, Beckum (DE); Peter Rausch, Münster (DE); Burkhard Topp, Soest (DE); Mario Zehanciuc, Büren (DE); Arnd-Claus Büchner, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 19/188,220

(22) Filed: Apr. 24, 2025

(65) Prior Publication Data

US 2025/0251106 A1 Aug. 7, 2025

Related U.S. Application Data

(63) Continuation of application No. PCT/EP2022/080369, filed on Oct. 31, 2022.

(51) Int. Cl.

*F21S 41/20* (2018.01)
*F21S 41/153* (2018.01)
(Continued)

(52) U.S. Cl.

CPC ........... *F21S 41/285* (2018.01); *F21S 41/153* (2018.01); *F21S 41/26* (2018.01); *F21S 41/275* (2018.01); *F21S 41/663* (2018.01); *F21S 45/47* (2018.01); *F21W 2102/135* (2018.01); *F21Y 2115/10* (2016.08)

(58) Field of Classification Search

CPC ........ F21S 41/151; F21S 41/153; F21S 41/26; F21S 41/285; F21S 41/275; F21S 41/25; F21S 41/663; F21W 2102/135; F21V 5/008; F21Y 2113/00; F21Y 2113/20

See application file for complete search history.

(56) References Cited

U.S. PATENT DOCUMENTS

2016/0327235 A1* 11/2016 Khrushchev ............ F21V 5/007
2017/0276309 A1 9/2017 Nakazawa et al.
(Continued)

FOREIGN PATENT DOCUMENTS

DE 102011013211 A1 9/2012
EP 3343091 A1 * 7/2018 ............ F21S 41/365
EP 3699486 A1 8/2020

*Primary Examiner* — Erin Kryukova

(74) *Attorney, Agent, or Firm* — Husch Blackwell LLP

(57) ABSTRACT

A headlamp for a motor vehicle includes a first light source having light emitting diodes or laser diodes arranged in a matrix for generating a high beam distribution, at least one second light source for generating at least part of a low beam distribution, a first primary optics for the light emitted by the first light source, a second primary optics for the light emitted by the second light source, and a secondary optics including a refractive optical component. The light emanating from the first light source passes successively through the first primary optics and the refractive optical component of the secondary optics. The light emanating from the at least one second light source passes successively through the second primary optics and the refractive optical component of the secondary optics.

17 Claims, 1 Drawing Sheet

(51) Int. Cl.

| | |
|---|---|
| ***F21S 41/26*** | (2018.01) |
| ***F21S 41/275*** | (2018.01) |
| ***F21S 41/663*** | (2018.01) |
| ***F21S 45/47*** | (2018.01) |
| ***F21W 102/135*** | (2018.01) |
| ***F21Y 115/10*** | (2016.01) |

(56) References Cited

U.S. PATENT DOCUMENTS

| | | | | |
|---|---|---|---|---|
| 2017/0292671 | A1 | 10/2017 | Gousset-Rousseau | |
| 2020/0072428 | A1 | 3/2020 | Simchak et al. | |
| 2022/0003375 | A1* | 1/2022 | Sugiyama | F21S 41/663 |
| 2022/0282846 | A1 | 9/2022 | Lu et al. | |
| 2023/0213161 | A1* | 7/2023 | Li | F21S 41/255<br>362/511 |
| 2023/0383920 | A1* | 11/2023 | Lee | F21S 43/15 |
| 2024/0093850 | A1* | 3/2024 | Jin | F21S 41/143 |

* cited by examiner

HEADLAMP FOR A MOTOR VEHICLE

CROSS REFERENCE

This application claims priority to PCT Application No. PCT/EP 2022/080369, filed Oct. 31, 2022, the entirety of which is hereby incorporated by reference.

FIELD OF THE INVENTION

The present invention relates to a headlamp for a motor vehicle.

BACKGROUND OF THE INVENTION

Compact, pixelated light sources with small distances between the illuminating surfaces already enable the realization of very compact module concepts. Corresponding module concepts are also referred to as SSL technology. By imaging the illuminating surface into the traffic area, the desired light distribution such as an adaptive driving beam (ADB) can already be realized.

An example of a headlamp with an adaptive driving beam can be found in U.S. Pat. No. 10,876,699 B2. The headlamp described therein comprises a plurality of light emitting diodes (LED) aligned in a first direction. One or more projection lenses having a toric-shape are adapted for shaping light emitted from the plurality of the light emitting diodes along the first direction. A beam shaping optic is adapted to shape light emitted from the one or more projection lenses along a second direction, different from the first direction, such that a desired beam shaping pattern is produced by the beam shaping optic in combination with the one or more projection lenses. A controller is adapted for independently controlling each of the plurality of light emitting diodes for adaptively dimming portions of a vehicle headlamp beam of light.

However, such concepts are only known for high beam distributions. Current concepts based on SSL technology allow the implementation of high beam functionalities and at most a range portion of a low beam distribution, depending on the pixelation. Until now, a second module has had to be used to implement a full light distribution, which either generates a full low beam or, for example, at least generates the prefield portion and the cut-off of a low beam distribution. Another disadvantage is the external appearance of the headlamp, which, because of the second module, has several separate and usually differently designed exit surfaces.

BRIEF SUMMARY OF THE INVENTION

The object of the present invention to provide a headlamp of the type mentioned at the beginning which, despite producing a full light distribution consisting of a low beam and a high beam, is comparatively compact and/or has a more attractive external appearance.

In an example embodiment, the headlamp comprises: a first light source comprising light emitting diodes or laser diodes arranged in a matrix for generating a high beam distribution; at least one second light source for generating at least part of a low beam distribution; a first primary optics for the light emitted by the first light source; a second primary optics, for the light emitted by the second light source; a secondary optics comprising a refractive optical component, the headlamp being arranged such that the emanating from the first light source passes successively through the first primary optics and the refractive optical component of the secondary optics, and such that the light emanating from the at least one second light source passes successively through the second primary optics and the refractive optical component of the secondary optics.

By using the secondary optics for the portions of the light distribution generated by the first light source and by the at least one second light source, the external appearance of the headlamp can be made more appealing. In particular, a so-called single-eye design is created, in which only one exit surface is required for the full light distribution generated by the headlamp.

Furthermore, it is possible for the first light source, the at least one second light source, the first primary optics, the second primary optics and the secondary optics to be combined to form a module, in particular with the first light source, the at least one second light source, the first primary optics, the second primary optics and the secondary optics are arranged on or in a common housing. As a result, the headlamp can be made comparatively compact.

It can be provided that the refractive optical component of the secondary optics has a first section, the headlamp being arranged such that the light emanating from the first light source passes through the first section after passing through the first primary optics, in particular wherein the first section being designed as a projection lens. Through the first section of the refractive optical component of the secondary optics, which is designed in particular as a projection lens, the light emanating from the first primary optics can be projected into the exterior of the motor vehicle.

It may further be provided that the refractive optical component of the secondary optics comprises at least one second section, the headlamp being arranged such that the light emanating from the at least one second light source passes through the at least one second section after passing through the second primary optics.

Thereby, it may be provided that the at least one second section of the refractive optical component is different from the first section of the refractive optical component, in particular wherein the at least one second section of the refractive optical component is spaced apart from the first section of the refractive optical component. As a result, the portions of the light distribution of the headlamp generated by the first light source and the at least one second light source can pass through the secondary optics along different paths and be projected and/or shaped differently by the secondary optics into the exterior space.

It is possible that the at least one second section of the refractive optical component comprises a cylindrical lens array. In this regard, the cylindrical axes of the cylindrical lenses of the cylindrical lens array may be oriented vertically when the headlight is installed in the motor vehicle. By aligning the cylindrical axes in the vertical direction, the light emitted from the second light sources can be horizontally expanded and homogenized by the cylindrical lens array.

It may be provided that the first light source is a solid-state LED array. The solid-state LED array may also be an SSL HD LED. In particular, the headlamp comprises a control unit which is arranged to control the first light source such that an adaptive driving beam is generated.

It is possible for the first primary optic to comprise at least one lens, the headlamp being arranged such that the at least one lens of the first primary optics contributes to imaging the first light source into the exterior of the motor vehicle. In this regard, the at least one lens of the first primary optics may, together with the first portion of the secondary optics, image the first light source into the exterior of the motor vehicle.

It may be provided that a plurality of second light sources are provided, which are arranged in particular in rows and/or columns. It may further be provided that the second primary optics comprises at least one lens, the headlamp being arranged such that the at least one lens of the second primary optics contributes to imaging the at least one second light source into the exterior of the motor vehicle, in particular wherein each of the second light sources is associated with one of the lenses of the second primary optics such that light emanating from one of the second light sources passes through the associated lens of the second primary optics.

It is possible that the first light source is arranged on a printed circuit board and that the at least one second light source is a light emitting diode, which is arranged in particular on the same printed circuit board as the first light source. This means that no additional printed circuit board has to be provided for the at least one second light source, so that the costs for manufacturing the headlamp can be reduced.

It may be provided that the headlamp comprises a heat sink associated with both the first light source and the at least one second light source. This eliminates the need to provide an additional heat sink for the at least one second light source, thus further reducing the cost of manufacturing the headlamp.

It is possible that the portion of a low beam distribution generated by the at least one second light source, the second primary optics and the secondary optics is a prefield portion and/or the cut-off of the low beam distribution. In this case, a range portion of the low beam distribution can be generated by the first light source, the first primary optics and the secondary optics in addition to the high beam distribution.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the figures, identical and functionally identical parts are given the same reference signs.

Figure 1:
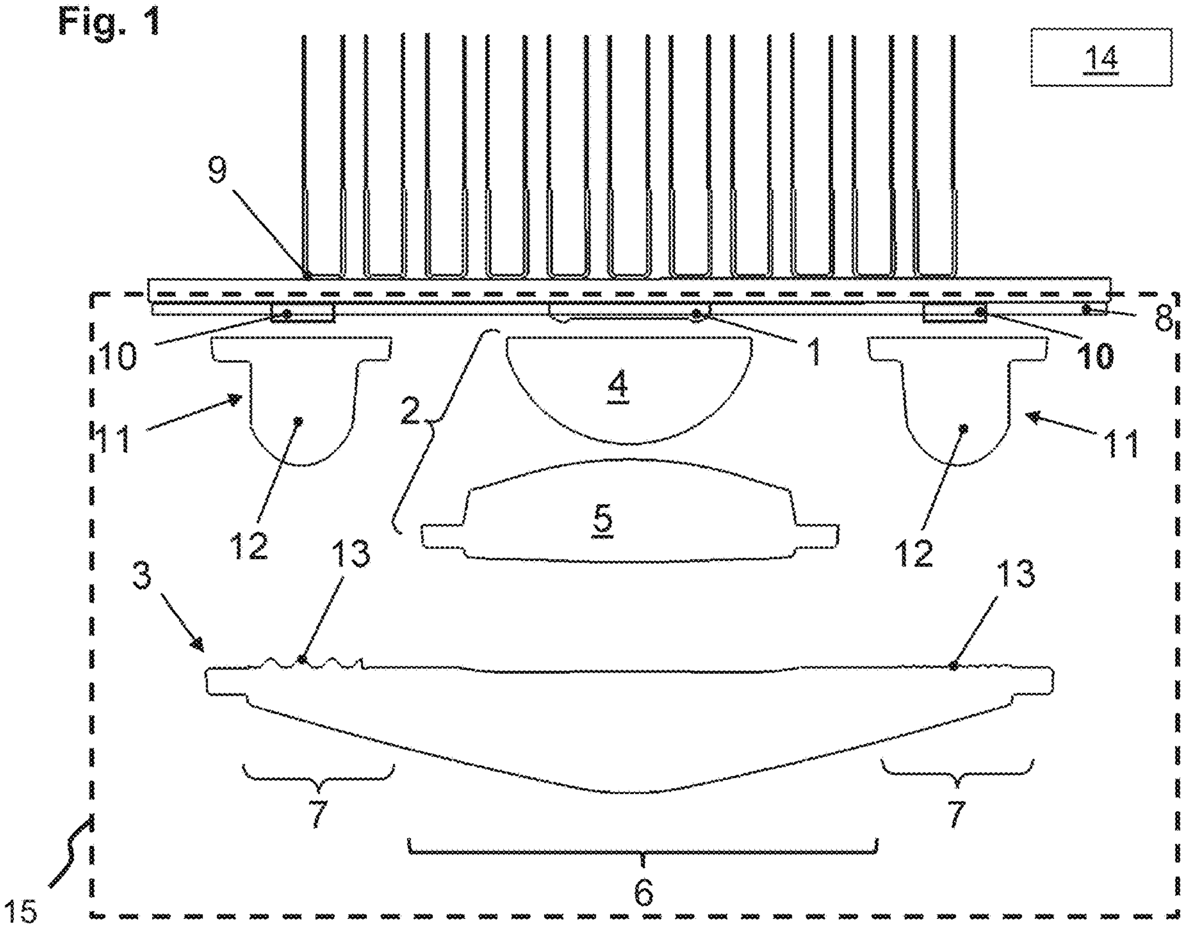
FIG. 1 illustrates a horizontal section through a part of a headlamp according to an example embodiment the invention.
Figure 2:
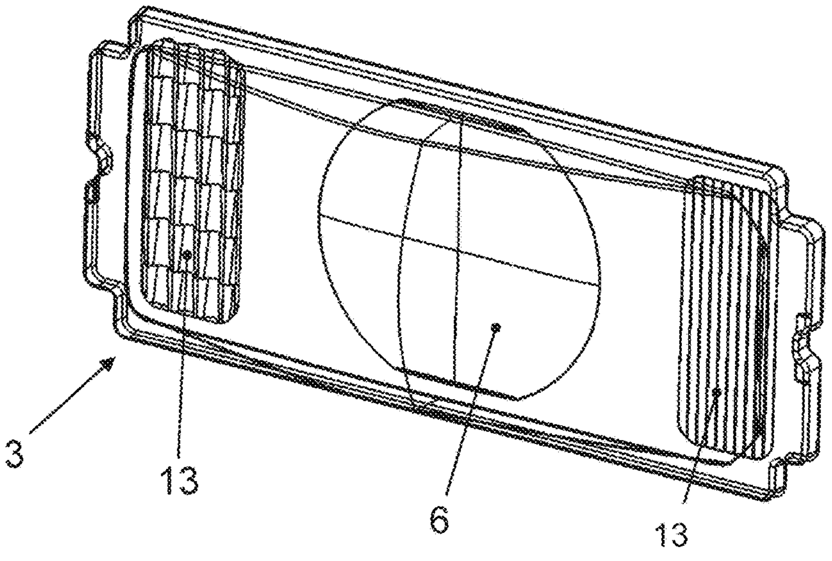
FIG. 2 illustrates a perspective view of the secondary optics of the headlamp according to FIG. 1.

The embodiment of a headlamp according to the invention illustrated in FIG. 1 and FIG. 2 comprises a first light source 1, which is designed in particular as a solid-state LED array. The headlamp further comprises a control unit 14 which can control the first light source 1 such that an adaptive driving beam is generated.

The headlamp further comprises a first primary optics 2 associated with the first light source 1 and a secondary optics 3. The first primary optics 2 has two lenses 4, 5 arranged one behind the other in the propagation direction of the light (not shown) emanating from the first light source 1. The secondary optics 3 has or is formed as a refractive optical component, which has a first section 6 in the center and two second sections 7 laterally. The first section 6 is plano-convex in shape and can, in particular, be designed as a projection lens.

The headlamp is arranged such that the light emitted by the first light source 1 first passes through the two lenses 4, 5 of the first primary optics 2 and then through the first section 6 of the secondary optics 3. In doing so, the lenses 4, 5 of the first primary optics 2 together with the first section 6 of the secondary optics 3 can image the first light source into the exterior of the motor vehicle.

In particular, a high beam distribution and additionally a range portion of a low beam distribution can be generated by the first light source 1, the first primary optics 2 and the first section 6 of the secondary optics 3.

The headlamp further comprises a printed circuit board 8 on which the first light source, in particular designed as a solid-state LED array, is arranged. The headlamp further comprises a heat sink 9, which is arranged on the circuit board 8 and can dissipate the heat generated by the first light source 1.

The headlamp comprises at least one second light source 10. In the illustrated embodiment, four second light sources 10 are provided, two of which are arranged one below the other next to the first light source 1 and to the left and right of the first light source 1, respectively, in FIG. 1. It is certainly possible to provide more or less than four second light sources 10. Furthermore, the second light sources 10 can also be arranged only in one row or only in one column.

The second light sources 10 are designed as light-emitting diodes (LEDs). The second light sources 10 designed as light emitting diodes are arranged on the same circuit board 8 as the first light source 1. The heat sink 9 can thus also dissipate the heat generated by the second light sources 10.

The headlamp further comprises a second primary optics 11. In the illustrated embodiment, the second primary optics 11 has four lenses 12, two of which are arranged one below the other next to the first primary optics 2 and to the left and right of the first primary optics 2, respectively, in FIG. 1. It is certainly possible to provide more or less than four lenses 12 of the second primary optics 11. Furthermore, the lenses 12 of the second primary optics 11 can also be arranged only in one row or only in one column.

In this regard, each of the second light sources 10 is associated with one of the lenses 12 of the second primary optics 11 such that light (not shown) emanating from one of the second light sources 10 passes through the associated lens 12 of the second primary optics 11. The headlight is adapted to cause the lenses 12 of the second primary optics 11 to at least contribute to imaging the second light source 10 into the exterior of the motor vehicle.

In particular, a prefield portion and the cut-off of the low beam distribution can be generated by the second light sources 10, the lenses 12 of the second primary optics 11 and the second sections 7 of the secondary optics 3.

The two laterally arranged second sections 7 of the secondary optics 3 designed as a refractive optical component each have a cylindrical lens array 13 on the side facing the primary optics 2, 11. The cylindrical axes of the cylindrical lenses of the cylindrical lens array 13 are aligned vertically when the headlamp is installed in a motor vehicle. In the illustrated embodiment example, the cylindrical lenses arranged on the left in FIG. 1 are larger and differently shaped than the cylindrical lenses arranged on the right in FIG. 1 (see also FIG. 2). However, it is certainly possible to make the cylindrical lenses in both second sections 7 the same. Furthermore, it is possible that the cylindrical lens arrays 13 are arranged on the side of the refractive optical component facing away from the primary optics 2, 11.

By aligning the cylindrical axes in the vertical direction, the light emitted from the second light sources 10 or from the lenses 12 of the second primary optics 11 can be expanded horizontally and homogenized by the cylindrical lens array 13.

The first light source 1, the at least one second light source 10, the first primary optics 2, the second primary optics 11 and the secondary optics 3 are combined into a module in which the side of the refractive optical component of the secondary optics 3 facing away from the primary optics 2, 11 forms the sole exit surface. The headlamp further comprises a housing 15 on or in which the first light source 1, the at least one second light source 10, the first primary optics 2, the second primary optics 11 and the secondary optics 3 are arranged.

LIST OF REFERENCE SIGNS

1 First light source
2 First primary optics
3 Secondary optics
4,5 Lens of the first primary optics
6 First section of the secondary optics
7 Second section of the secondary optics
8 Printed circuit board
9 Heat sink
10 Second light source
11 Second primary optics
12 Lens of the second primary optics
13 Cylindrical lens array

The invention claimed is:

1. A headlamp for a motor vehicle, the headlamp comprising:

a first light source including light emitting diodes or laser diodes arranged in a matrix for generating a high beam distribution;

at least one second light source for generating at least a portion of a low beam distribution;

first primary optics for light emitted by the first light source;

second primary optics for light emitted by the at least one second light source; and secondary optics including a refractive optical component having a first section and at least one second section, wherein the headlamp is arranged such that the light emanating from the first light source passes successively through the first primary optics and the first section of the refractive optical component of the secondary optics, wherein the light emanating from the at least one second light source passes successively through the second primary optics and the at least one second section of the refractive optical component of the secondary optics, and wherein each second section of the at least one second section of the refractive optical component comprises a cylindrical lens array positioned on a side of the refractive optical component facing the second primary optics.

2. The headlamp according to claim 1, wherein the first light source, the at least one second light source, the first primary optics, the second primary optics and the secondary optics are combined to form a module.

3. The headlamp according to claim 2, wherein the first light source, the at least one second light source, the first primary optics, the second primary optics and the secondary optics are arranged on or in a common housing.

4. The headlamp according to claim 1, wherein the at least one second section of the refractive optical component is different from the first section of the refractive optical component.

5. The headlamp according to claim 4, wherein the at least one second section of the refractive optical component is spaced apart from the first section of the refractive optical component.

6. The headlamp according to claim 1, wherein cylindrical axes of cylindrical lenses of the cylindrical lens array are aligned vertically when the headlamp is installed in the motor vehicle.

7. The headlamp according to claim 1, wherein the first light source is a solid-state LED array.

8. The headlamp according to claim 1, wherein the headlamp comprises a control unit which is arranged to control the first light source such that an adaptive driving beam is generated.

9. The headlamp according to claim 1, wherein the first primary optics include at least one lens, wherein the at least one lens of the first primary optics contributes to imaging the first light source into an exterior of the motor vehicle.

10. The headlamp according to claim 1, wherein the at least one second light source comprises a plurality of second light sources.

11. The headlamp according to claim 1, wherein the second primary optics include at least one lens, wherein the at least one lens of the second primary optics contributes to imaging the at least one second light source into an exterior of the motor vehicle.

12. The headlamp according to claim 11, wherein the at least one second light source comprises a plurality of second light sources and the second primary optics include a plurality of lenses, and wherein each second light source of the plurality of second light sources is associated with a lens of the plurality of lenses of the second primary optics such that light emanating from the plurality of second light sources passes through the plurality of lenses of the second primary optics.

13. The headlamp according to claim 1, wherein the first light source is arranged on a printed circuit board and wherein the at least one second light source comprises a light emitting diode.

14. The headlamp according to claim 13, wherein the light emitting diode of the at least one second light source is arranged on the same printed circuit board as the first light source.

15. The headlamp according to claim 1, wherein the headlamp includes a heat sink associated with both the first light source and the at least one second light source.

16. The headlamp according to claim 1, wherein the portion of the low beam distribution generated by the at least one second light source, the second primary optics and the secondary optics is a prefield portion and/or a cut-off of the low beam distribution.

17. The headlamp according to claim 1, wherein the first section is designed as a projection lens.

* * * * *